March 7, 1944.    J. W. BRYCE    2,343,398
RECORD CONTROLLED INTERPRETING MACHINE
Filed June 7, 1941    5 Sheets-Sheet 1

INVENTOR
James W. Bryce
BY
W. M. Wilson
ATTORNEY

March 7, 1944.   J. W. BRYCE   2,343,398
RECORD CONTROLLED INTERPRETING MACHINE
Filed June 7, 1941   5 Sheets-Sheet 3
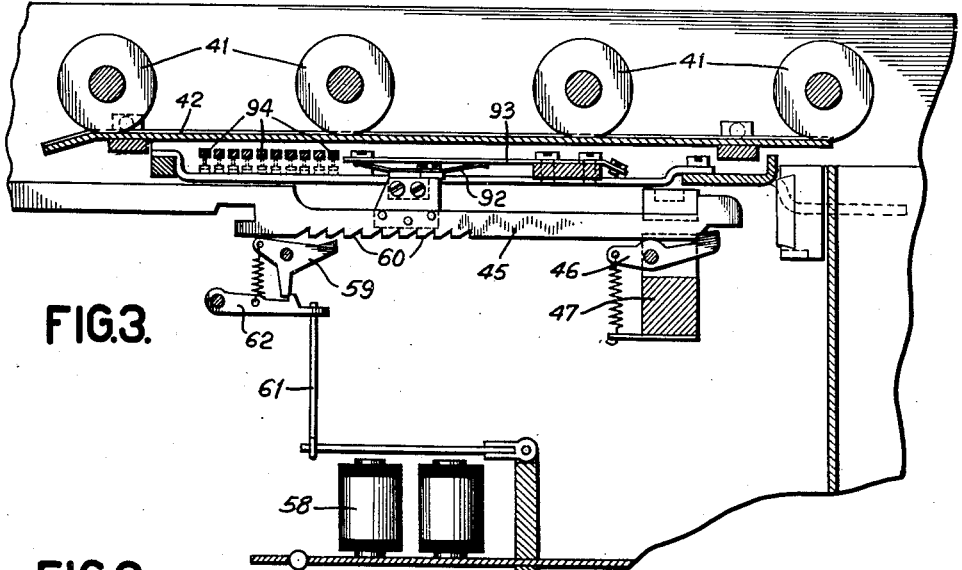
FIG.3.
FIG.6.
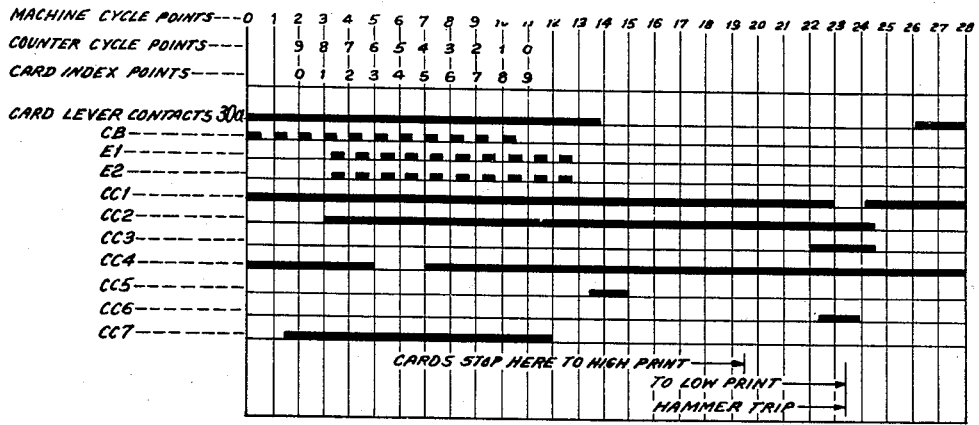
FIG.8.
INVENTOR
James W. Bryce
BY
W. M. Wilson
ATTORNEY March 7, 1944.  J. W. BRYCE  2,343,398
RECORD CONTROLLED INTERPRETING MACHINE
Filed June 7, 1941   5 Sheets-Sheet 4

INVENTOR
James W. Bryce
BY
W. M. Wilson
ATTORNEY

March 7, 1944.    J. W. BRYCE    2,343,398
RECORD CONTROLLED INTERPRETING MACHINE
Filed June 7, 1941    5 Sheets-Sheet 5

INVENTOR
James W. Bryce
BY
ATTORNEY

Patented Mar. 7, 1944

2,343,398

UNITED STATES PATENT OFFICE 2,343,398

RECORD CONTROLLED INTERPRETING MACHINE

James W. Bryce, Glen Ridge, N. J., assignor to International Business Machines Corporation, New York, N. Y., a corporation of New York Application June 7, 1941, Serial No. 397,003

6 Claims. (Cl. 101—93)

This invention relates to record controlled interpreting machines, and more particularly to such machines having provisions therein for checking the sensed data and the data to be recorded in order to prevent any recording operations whenever the data to be recorded fails to conform or correspond to the sensed data.

The present invention constitutes an improvement and modification of the interpreting machine disclosed and claimed in the copending application Serial No. 397,002, filed June 7, 1941.

In the said copending application, provision is made for storing the sensed data, and comparing the interpreting data recorded with the stored data to determine any failures of the recording operations to correspond to sensed data designations.

In the present application, the sensed data is stored in differentially settable members of the recording means before recording operations are effected. Checking means, controlled jointly by the sensing and recording means, are provided to determine the conformity of the data stored in the recording means and the sensed data. Upon determination of any disagreement between the sensed data and the data to be recorded, means are called into action for preventing any recording operations to be effected of the data stored in the recording means.

Accordingly, an object of the present invention resides in the provision of an improved registering or recording machine including storing means for storing data to be recorded in accordance with the sensed data designations wherein checking means are jointly controlled by sensing means and the said storing means for permitting recording of the stored data when the sensed and stored data correspond, and for preventing recording of the stored data when the said data fail to correspond.

Other objects of the invention will be pointed out in the following description and claims and illustrated in the accompanying drawings, which disclose, by way of example, the principle of the invention and the best mode, which has been contemplated, of applying that principle.

In the drawings:

Fig. 3 is a view in side elevation showing in normal position the contacting means controlled by the type bars.

Fig. 6 is a timing chart for certain control elements of the machine.

Fig. 8 is a fragmentary view of a suitable record card.

The mechanism disclosed herein for recording the interpreting data on the related sensed record cards is similar to the structure described in the said U. S. Patent 1,946,900, consequently, it is considered that the following brief description of the like elements, and their operations, is sufficient to comprehend the instant invention.

Record card feeding means

Figure 1:
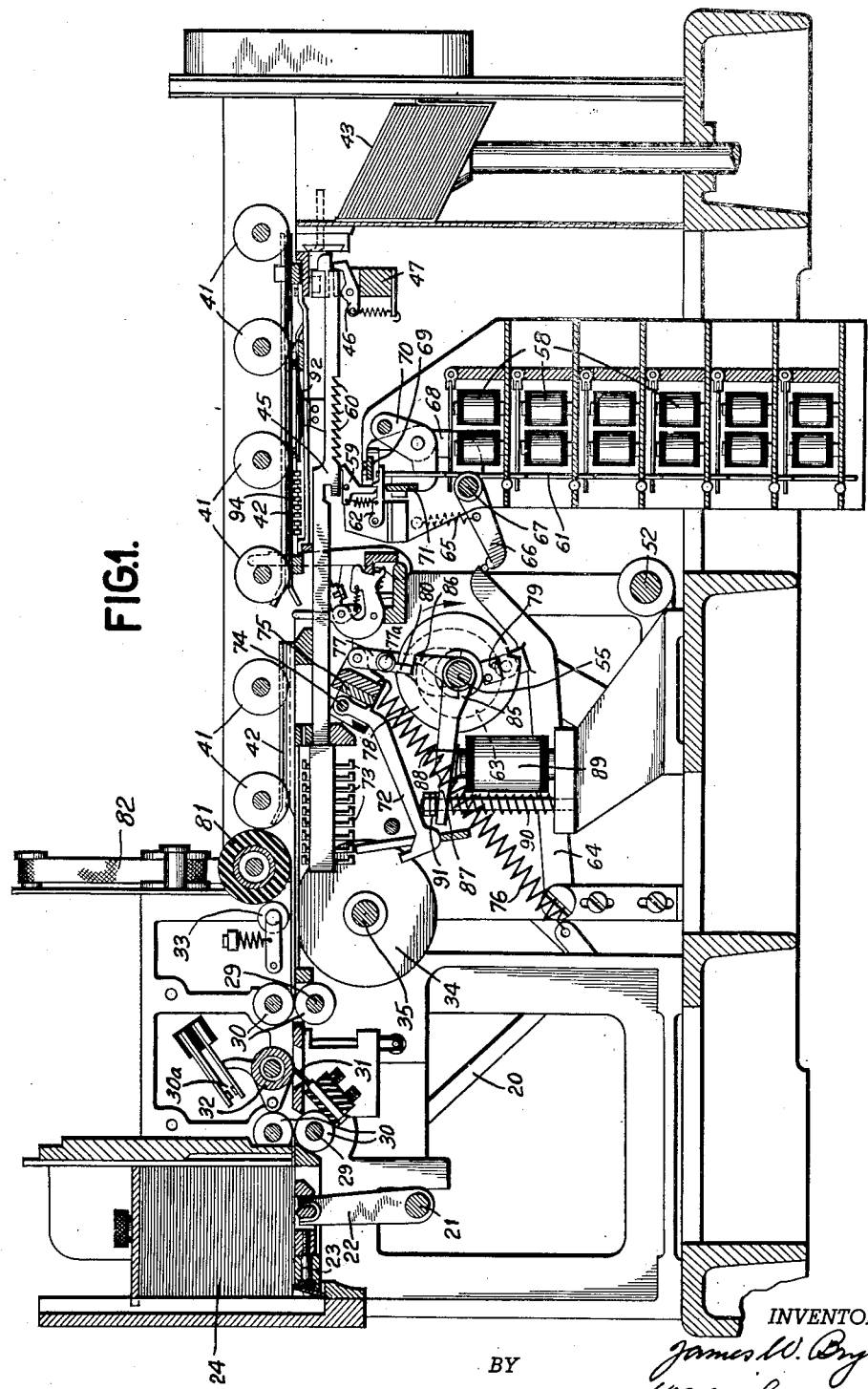
Fig. 1 is a central section of the machine.
Figure 2:
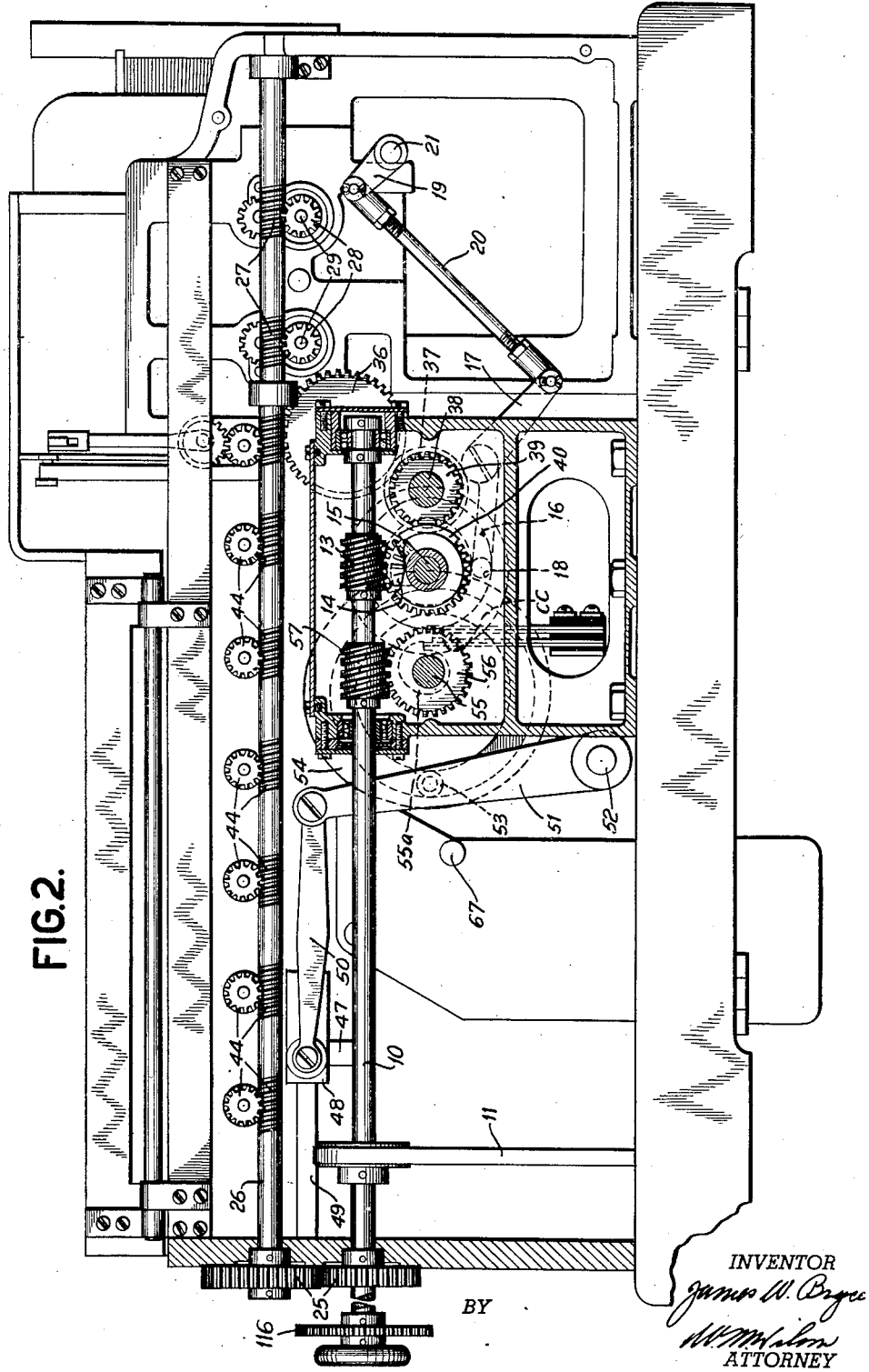
Fig. 2 is a sectional view taken at one side of the machine.

Referring now to Figs. 1 and 2, the mechanism will be described for feeding individually record cards from a stack and transporting the cards successively past the sensing station, then to the recording station where the cards are held stationary, momentarily, during the recording operations, and thence to a card receiving hopper.

A main drive shaft 10 is provided, which may be driven in any suitable manner, for example, by a motor M (Fig. 7) and a driving belt 11, which shaft is enabled to drive shaft 15 through the worm gearing 13 and 14. A box cam 16 is secured to shaft 15, which cam actuates the cooperating pivoted cam follower arm 17 and arm 19 through the adjustable connecting rod 20.

Arm 19 is secured to a shaft 21 having arms 22 (one of which is shown in Fig. 1) in pin and slot engagement with card picker 23 mounted for reciprocation in the frame of the machine. By means of the actuated shaft 21 and the reciprocating picker mechanism, record cards are advanced, one at a time, from the supply stack 24.

Through gears 25 (Fig. 2), the shaft 10 drives a parallel shaft 26 which has threaded sections 27 meshing with worm gears 28 on roller shafts 29 to drive continuously the feed rollers 30. The advanced cards are fed, by the said feed rollers, past the record sensing means comprising the conventional sensing brushes 31 and contact roller 32. After passing the sensing brushes, each card passes to a pair of intermittently driven rollers comprising an upper spring pressed roller 33 and a lower roller 34. These rollers 33 and 34 advance the cards to a printing station, and then momentarily are paused in their rotation to permit printing on each card in accordance with the preceding analysis.

This interruption in the advancement of the cards is accomplished as follows: Roller 34 is secured to a shaft 35 having attached at one end a gear 36 meshing with a gear 37 on shaft 38, on which shaft is also secured a gear 39 driven by a mutilated gear 40 on the continuously rotated shaft 15. Thus, during the rotation of shaft 15 the gear will pick up gear 39 to advance each card to printing position, whereupon, at this particular moment in the cycle of operation, the toothless portion of gear 40 moves into locking engagement with gear 39 as shown in Fig. 2. Upon completion of the printing operations, gear 39 is again engaged for rotation, and each card is then fed forward to a conveyor comprising rollers 41 and tracks 42, which convey the cards to a suitable discharge hopper 43. The shafts upon which rollers 41 are secured are continually driven by the gear connections 44 to the shaft 26.

It should be mentioned that a conventional type of card lever is provided between rollers 30 and the sensing station for controlling contacts 30a. These contacts are closed as long as cards are fed from the supply stack, by virtue of the engagement of the cards with the said card lever.

Printing means

For effecting the printing on the record cards, as they successively pass through the machine, a plurality of type bars 45 (Fig. 1) are provided. These bars are all mounted for reciprocation in the frame of the machine, and each have a connection through a spring-pressed pawl 46 to a crosshead 47. Thus, in Fig. 1, upon movement of crosshead 47 to the left, the pawls 46, through frictional engagement with bars 45, will move the bars concurrently in the same direction.

The bars may be arrested at any point in their travel, and subsequently the pawls 46 disengage from, and permit further movement of, the crosshead 47. Upon the reverse movement of crosshead 47, the projecting ends of the bars 45 are engaged thereby to positively move the bars to restored position. For reciprocating crosshead 47 the following mechanism is provided.

In Fig. 2, the crosshead 47 is connected at its ends to blocks 48, slidable upon rods 49, and having pivoted link connections 50 to a follower arm 51 pivoted at 52. Arm 51 has a roller 53 cooperating with the cam groove of a box cam 54 mounted on a shaft 55 connected through worm gear 56 and worm 57 to the constantly running shaft 10. The arrangement and timing of the parts is such that the type bars 45 are advanced under the influence of pawls 46 synchronously with the movement of a card past the sensing brushes 31.

If a perforation at, say, the 5 position on the card were under the sensing brushes, the corresponding type representing 5 would be at the printing line. The establishment of an electric circuit through the index point perforations by the brushes causes a magnet 58 to be energized. There are a number of these magnets 58 corresponding to the different columns in the card, each magnet being related to a corresponding type bar 45. The energization of any magnet causes the release of a related pawl device 59 through a wire 61 and latch 62, and allow it to engage one of the ratchet teeth 60 on the bar 45. After pawl 59 engages the teeth 60, further movement of the type bar 45 to the left in Fig. 1 is prevented. The type bars 45 are positioned during the passage of a card past the brushes. Subsequently, these type bars are held stationary during the period that a card passes from the analyzing station to printing position, and during the printing operation. After the printing operation, pawls 59 and latches 62 are positively restored in the following manner.

Secured to shaft 55 is a cam 63 (Fig. 1) which cooperates with and actuates an arm 64 pressed upwardly by a spring 65 acting through an arm 66 on shaft 67. The shaft 67 has an arm 68 to which is secured a restoring plate 69, and through connection to a pivoted arm 70 also actuates a restoring plate 71. In this manner, cam 63 moves plate 69 to the left, as viewed in Fig. 1, to restore pawls 59, and plate 71 upwardly to restore latches 62 and their connected wires 61.

For each type bar 45 there is an individual hammer 72 which strikes the particular type 73 on the type bar at the printing line. The hammers are pivotally mounted on a rod 74 carried by a bar 75 and depend for their actuation upon movement of said bar. The bar 75 is pivoted on the frame of the machine, by means of pintles co-axial with rod 74, and has springs 76 biasing the bar in a clockwise direction in Fig. 1. To the middle of bar 75 there is pivoted a cam follower arm 77 bifurcated to straddle shaft 55 and having a roller 77a in cooperation with a cam 78. Fixed to one face of the cam 78 is a cam member 79 which cooperates with a projection 80 of the cam follower arm 77.

As the cam 78 revolves, by virtue of the shaft 55 being driven in the manner previously described, it cooperates with the arm 77 through its follower roller 77a, gradually retracting the hammers 72 in a counterclockwise direction against the tension of springs 76. As the roller 77a leaves the high point of the cam 78, member 79 engages the projection 80, and upon continued rotation of the cam, the projection 80 drops from the member 79, and the springs 76, thus released, turn the common bar 75, in a clockwise direction, to swing the hammers 72 against type 73, thus effecting printing.

It was mentioned hereinabove, that means are provided in the present machine for preventing the printing operations to be effected, whenever the checking means provided herein detect that the differentially positioned type-bars, which in the instant case constitute the means for storing the data sensed on the records, are not in conformity with the sensed designations. To this end, provision is made to prevent the hammers from being tripped in order to prevent printing of the data, which mechanism will now be described.

In Fig. 1, a bellcrank member 85 is loosely mounted on shaft 55, one arm 86 of which is normally disposed out of the path of the projection 80, the other arm 87, which is secured to armature 88 of the control magnet 89, normally is urged in a clockwise direction, by the spring 90, against the stop 91 to maintain the arm 87 in the position shown.

Upon energization of magnet 89, the armature 88 is attracted to rotate the member 85, in a counterclockwise direction, and thus, cause the arm 86 thereof to be disposed in the path of projection 80. Now, as the roller 77a leaves the high point of the cam 78, the projection 80 is prevented from dropping on the member 79, by means of the arm 86, which is disposed directly in the path of the said projection. In this manner, the common bar 75 is prevented from causing the hammers 72 to be directed against the type 73, and thus prevent any printing of the data set up on the differentially positioned typebars, to be effected. Upon continued rotation of the cam 78, the projection 80 is raised, and arm 86 is restored to the normal position, out of the path of the projection, by means of the action of spring 90.

In Fig. 1, the reference character 81 designates a printing platen journaled in the frame of the machine and adapted to be turned by frictional engagement with the passing card to prevent excessive wear at any one place. The inking ribbon devices are of conventional form and require no detailed description, the ribbon 82 being guided along the platen 81 and beneath the record card. In Fig. 8, a portion of a perforated record card is shown with the interpreting data printed at the top of the card, and disposed at the head of each corresponding perforated column.

It should also be mentioned that a plurality of cam elements 55a (Fig. 2) are provided and secured to shaft 55 for controlling the operations of the related contacts, such as the contacts CC1 to CC7, and CB. The brushes B1 and B2 of the emitter devices E1 and E2 are also secured to shaft 55 (see Figs. 6 and 7). The timing arrangement of the operations of these contacts and brushes is shown in Fig. 6.

*Checking means*

The mechanism of the checking means, referred to hereinabove, for checking the conformity of the sensed data and data to be recorded will now be described. This means comprises generally a plurality of circuit closing units, one unit or group being under control of the printing means, and the other unit or group being under control of the sensing means. The former will be described first.

With reference now to Figs. 1 and 3, each typebar 45 is provided with a contact making spring element 92 which normally, and in any differential position of the typebar, always engages the conducting strip 93; and, at a differential position of the typebar 45, the said spring element 92 also engages one of a series of conducting bars 94, depending upon the positioning of the typebar. The controlling functions of this circuit closing or reading unit for reading out the data values represented by the differentially positioned or set typebars will be explained later, in detail.

Figure 4:
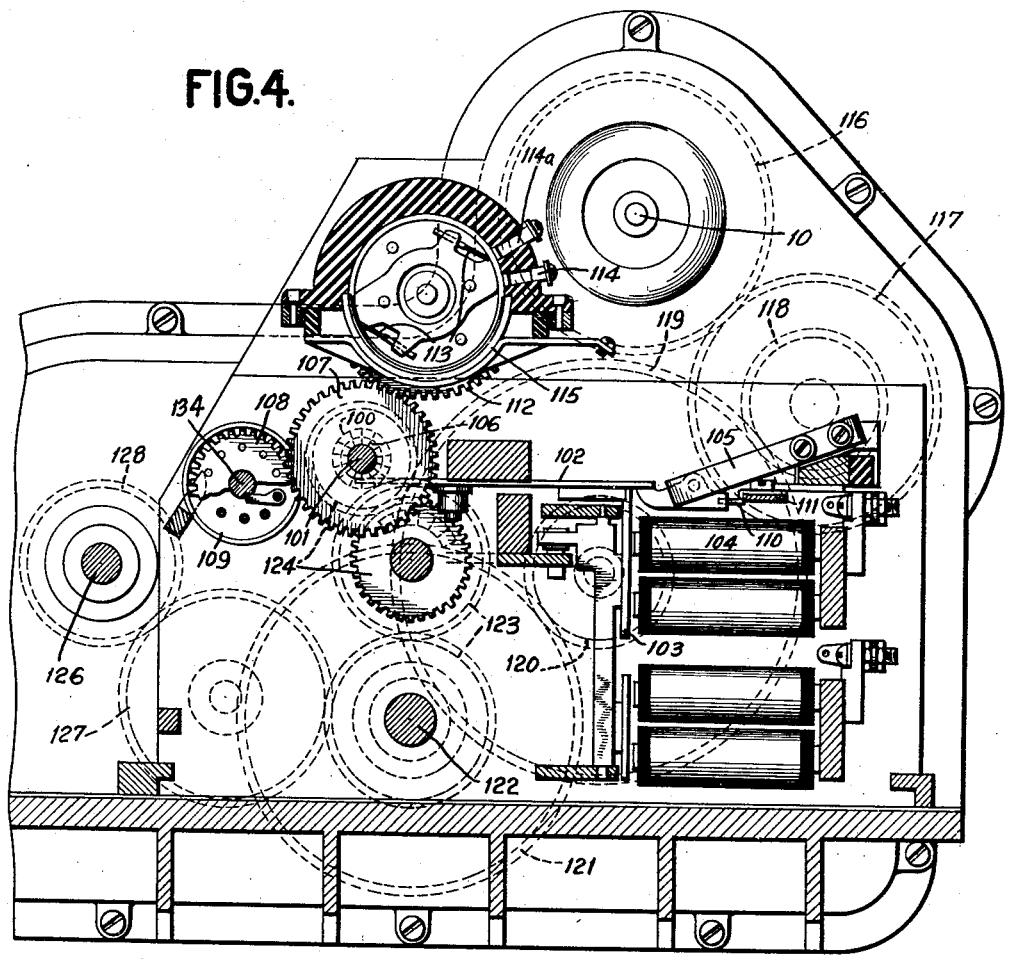
Fig. 4 is a sectional view of one type of data receiving means.
Figure 5:
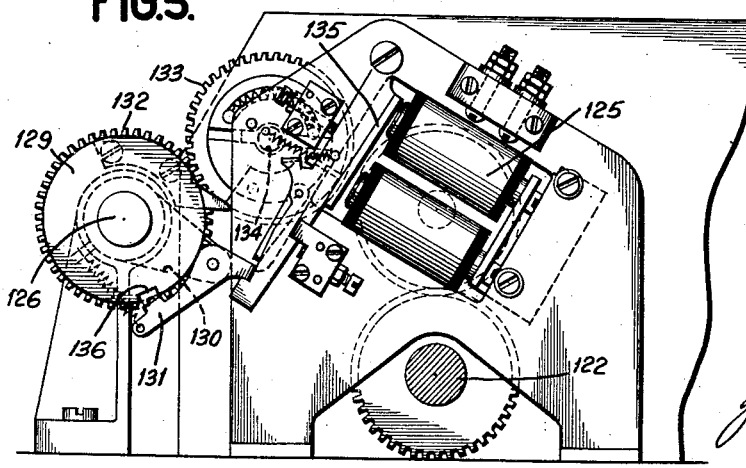
Fig. 5 is an end view of the resetting driving and control mechanism for the data receiving means.

With reference now to Figs. 4 and 5, the circuit closing unit under control of the sensing means will be described. In order to simplify this description, the unit chosen for illustrative purposes comprises part of the well known data accumulating means disclosed in U. S. Patents 1,965,979 and 1,976,617. Since the accumulation of data values forms no part of the present invention, the usual tens carry or transfer means of the individual denominational order are omitted herein.

Referring now to Fig. 4, one order of this unit is shown to include a clutch element 100 which is slidably mounted on the shaft 101 and keyed for rotation therewith. A clutch element is provided for each order of the storing unit, and is provided with a groove in which fits the end of an arm of a suitably pivoted lever 102. This lever is normally held in the position shown by the armature 103 of magnet 104. Upon energization of the magnet its armature is attracted thereto, thereby releasing the lever 102, which is urged by the leaf spring 105, and causing the clutch element 100 to move into engagement with the cooperating teeth 106 which are integral with gear 107, the latter being loosely mounted on shaft 101. Gear 107, when thus coupled to shaft 101 rotates gear 108 which meshes therewith, and effects displacement of an index wheel 109.

It is to be understood that the magnets may be energized at different points in the machine cycle, depending upon the times at which establishment of the control circuits associated therewith are effected. The energization of these control circuits will be described in conjunction with the circuit diagram. At the end of each data entry cycle a declutching operation is effected by suitable control elements included in the unit and are described in greater detail in the said Patent 1,976,617. The rearward extremity of lever 102 is engaged, by a finger 110 carried on a bar 111, at the end of each entry cycle for disengaging the clutch element 100 from teeth 106, and effecting relatching of the armature 103. With reference to Fig. 6, it is seen that the declutching operation referred to occurs approximately between the 11 and 12 machine cycle points.

Also driven by gear 107 is a gear 112 which is displaced in the same manner as the index wheel. Carried by and insulated from gear 112 is a pair of electrically connected brushes 113, one of which is arranged to engage a single conducting segment 114 at the home position of the brushes, while the other engages an arcuate conducting strip 115 (also see Fig. 7). The relationship of the parts is such that when the index wheel 109 is in its zero or home position, one of the brushes is in contact with the conducting segment 114, and the other brush is in contact with the strip 115, thus forming an electrical connection between the two. An additional conducting segment 114a is provided and disposed adjacent to the said segment 114, so that upon displacement of the brushes 113 from the home position, the segment 114a is engaged thereby one cycle point later. The purpose of this arrangement will be understood as the description progresses.

The driving arrangement for shaft 101 includes a gear 116 (Fig. 2) secured to shaft 10, which gear meshes with gear 117. Integral with the latter is a gear 118 which meshes with gear 119. Secured to gear 119 is a small gear 120 which meshes with gear 121 securely mounted on shaft 122, the latter being the drive shaft of the unit, which is effective to drive shaft 101 through the gearing 123 and 124.

Provision is made herein for automatically resetting the readout brushes 113 to the home position each cycle. Referring to Fig. 5, this mechanism is shown to be under control of a reset magnet 125. One of the gears, designated generally by the reference character 123 is secured to shaft 122, is effective to drive the shaft 126 through the gears 127 and 128 (Fig. 4). The gear 128 has attached thereto a clutch disk 129 (Fig. 5), both the clutch disk and gear being loosely mounted on the said shaft 126. Attached to the shaft 126 is an arm 130 carrying a clutch pawl 131, and also to said shaft, there is secured a gear 132 meshing with a gear 133 attached to the reset shaft 134.

Upon energization of the reset magnet 125, the armature 135 is attracted to release the pawl 131 to engage the clutch notch 136 in the constantly rotating clutch disk 129, thereby causing the shafts 126 and 134 to be rotated to effect resetting of the brushes 113 to the home position, in a manner well known in the art, and described in detail in the said Patent 1,976,617.

Machine operations

Figure 7:
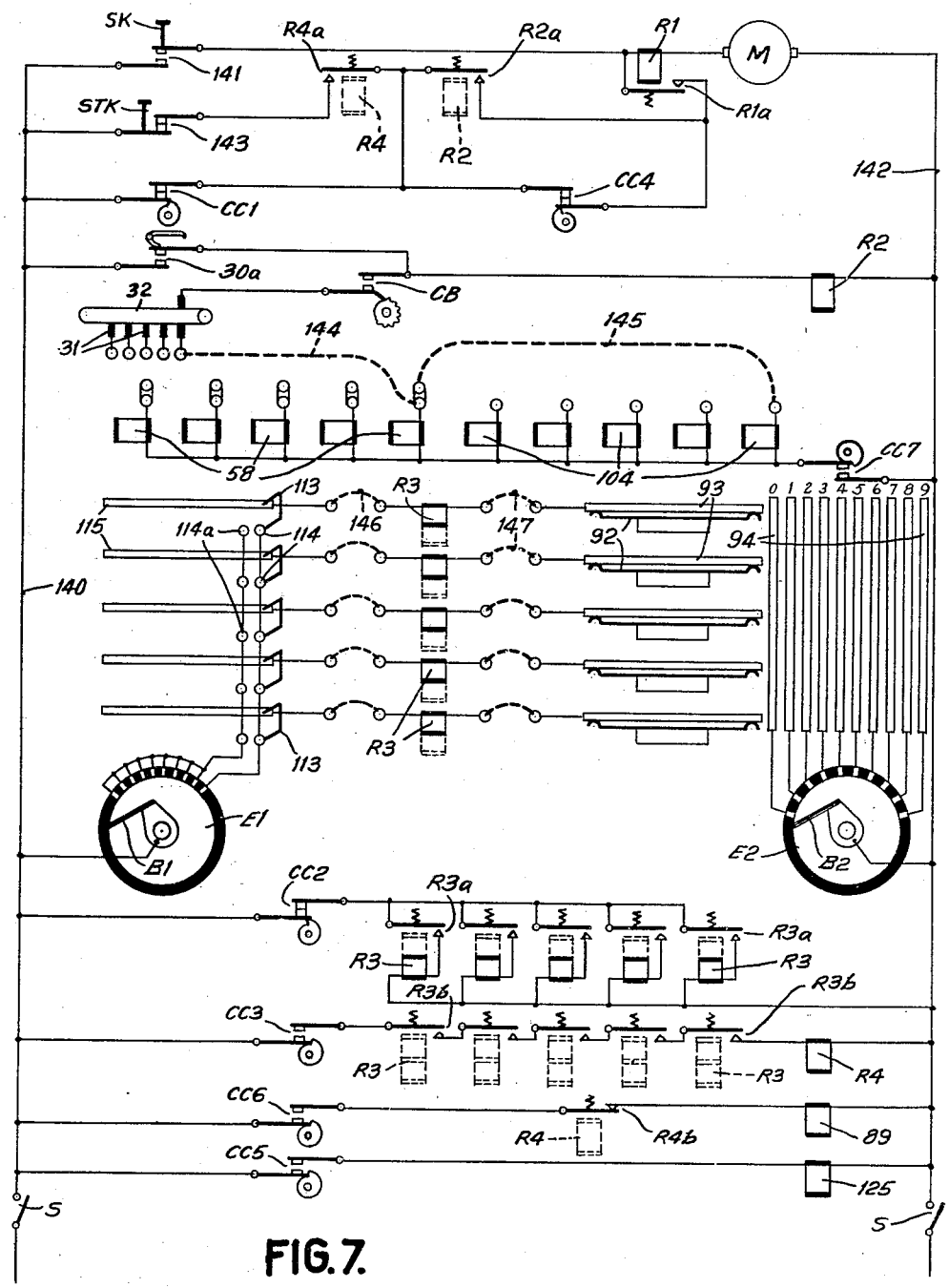
Fig. 7 is a circuit diagram of the connections of the electrical control elements of the machine.

*Starting circuits.*—Referring now to Fig. 7, with the line switches S closed, and upon depression of the start key SK, a circuit is completed from conductor 140 to the closed contacts 141 of the start key, coil of relay R1, motor M, to conductor 142, effecting energization of the said relay and motor. A holding circuit for relay R1 is established immediately upon closure of its contacts R1a, and can be traced as follows: Conductor 140, cam contacts CC1 and CC4, contacts R1a, coil of relay R1 and motor M to conductor 142. Upon energization of the said motor, the described driving connections are set into operation to feed the cards, one at a time, from the supply stack to the sensing and printing stations. Upon advancement of the first and following cards from the supply stack the contacts 30a are closed, as indicated in Fig. 6, to cause energization of relay R2, and consequently the closure of contacts R2a.

Another holding circuit for relay R1 can be traced from conductor 140 to cam contacts CC1, contacts R2a and R1a to coil of relay R1, motor M and conductor 142. So long as cards are fed to the machine, this latter holding circuit permits continuous machine operations, since this circuit shunts the cam contacts CC4, which open during the first part of each machine cycle.

Still another holding circuit is provided to shunt the cam contacts CC1, the latter opening during the latter part of each machine cycle. Provision is made whereby contacts R4a are closed at the time contacts CC1 open, whenever the checking operations indicate that the data set up in the printing means is in accordance with the data sensed on the records; thus, a circuit can be traced from conductor 140 to normally closed contacts 143 of the stop key STK, contacts R4a, R2a, and R1a to the coil of relay R1, motor M and conductor 142.

Therefore, so long as records are fed to the machine, and so long as the set up data in the printing means is in agreement with the sensed data to effect the closure of contacts R4a, during the latter part of the machine cycle, the operations of the machine are not interrupted. However, upon disagreement of the data stored or set up in the printing means and the sensed data, contacts R4a are caused to be opened, to effect interruption of further machine operations, by breaking the described holding circuit.

*Interpreting and checking circuits.*—Now, as the cards are advanced to the sensing station, the brushes 31 and conducting roller 32 are effective to complete circuits to the connected printing control magnets 58 at the differential times, in the first half period of the machine cycle, the perforations in the record cards are presented to the said brushes and roller. A typical circuit can be traced from conductor 140 to contacts 30a and CB (see Fig. 6), conducting roller 32, brush 31, plug connecting conductor 144, magnet 58, and cam contacts CC7 to conductor 142, energizing said magnet at the time in the cycle the perforation is sensed.

In this machine, the cards are fed so that the top edge of the card as shown in Fig. 8, is the leading edge, i. e., the index point positions are presented to the sensing station in the 0, 1, 2, 3, etc. order. It was mentioned hereinabove that the type elements of the typebars are advanced to the printing position in timed relationship with the passage of the index point positions past the sensing brushes. Therefore, upon sensing a "2" perforation in one column on the card, the magnet 58 is energized to release the pawl 59 to cause the related typebar to stop with the "2" type element opposite the printing position. Also, the related contact spring element 92 is positioned to complete an electrical connection between the conducting strip 93 and the "2" conducting bar 94.

At the same time magnet 58 is energized, a circuit is completed from the said sensing brush by the plug connecting conductor 145 to the coil of magnet 104 to effect energization of this magnet, and in turn cause the related brushes 113 to be displaced. Again, assuming a "2" perforation being sensed, the magnet 104 is energized at this time in the cycle (namely, the 4 machine index point, see Fig. 6) to effect the described clutching operation.

In Fig. 7, it is seen, that the conducting segments 114 and 114a are connected to the conducting segments of an emitter or commutator device E1, and the individual conducting bars 94 are connected to individual conducting segments of a second emitter device E2. The timing of the emitter brushes B1 and B2 is clearly indicated in the timing chart shown in Fig. 6. The said emitter brushes are arranged to engage the associated conducting segments one and a quarter cycle points after the corresponding index point positions of the cards have passed the sensing brushes. For example, upon sensing a "2" perforation in a column in the card, the magnets 104 and 58 are energized at this time in the machine cycle. As mentioned before, a clutching operation is effected to cause the related brushes 113 to be displaced, and the related typebar is stopped to present the "2" type to the printing position and also to displace the contact spring element 92 to engage the "2" conducting bar 94. Now, one and a quarter cycle points later, the brush B2, for example, of emitter E2 will engage the conducting segment thereof connected to the "2" conducting bar 94. Similarly, the brush B1, of emitter E1, will engage the third conducting segment thereof, which segment is connected by a common conductor to the conducting segment 114a, the latter at this moment being engaged by the displaced brushes 113.

It is remembered, that the magnet 58 is energized at the time a "2" perforation is sensed. Approximately an eighth of a cycle point lag is assumed for effecting a clutching operation to cause the related brushes to be displaced. Thus, one of the brushes 113 will start to engage the conducting segment 114a, one and an eighth cycle points after the said magnet 104 is energized. Now, as the brush B1 engages the third segment of the emitter one and a quarter cycle points after the said magnet 104 is energized, the said brush 113 is still in engagement with the said segment 114a so that the following typical circuit can be completed: Conductor 140, brush B1 and the third conducting segment of emitter E1, conducting segment 114a, brushes 113, conducting ring 115, plug connecting conductor 146, pick-up coil of relay R3, plug connecting conductor 147, conducting strip 93, contact spring 92, the "2" conducting bar 94, the third conducting segment and brush B2 of emitter E2 to conductor 142, energizing the said relay. Relay R3 is provided with a holding coil which is energized upon closure of the contacts R3a, as follows: Conductor 140, cam contacts CC2, contacts R3a, holding coil of relay R3 to conductor 142. This holding circuit is maintained until contacts CC2 open near the end of the cycle.

It is understood of course, that a relay R3 and associated circuit connections are provided, for each column of data to be printed. Thus, it is seen, that, whenever the data set up in the printing unit corresponds to the sensed data, the corresponding relays R3 are energized. With all the R3 relays energized, a circuit is established, later in the cycle, when cam contacts CC3 close, to complete a 'rcuit from conductor 140 to cam contacts CC3, the series connected contacts R3b to coil of relay R4 and conductor 142, energizing this relay to cause its contacts R4a to close, and R4b to open. Contacts R4a being closed, at the time cam contacts CC1 are opened permits the holding circuit for relay R1 to be maintained, thus permitting further continuous operations of the machine, and contacts R4b being opened, at the time cam contacts CC6 are closed, prevents a circuit from being completed to magnet 89.

It is recalled that energization of magnet 89 causes the suppression of any printing operations, but so long as magnet 89 remains deenergized printing operations are effected. Thus, it is seen that whenever the data stored in the printing unit corresponds to the sensed data, the corresponding relays R3 are energized by means of the described checking circuits, and so long as these relays are energized to permit a circuit to be completed to relay R4, at the proper time in the cycle, the data stored in the printing unit is recorded in the manner described hereinabove. But, whenever any one of the relays R3 is not energized, indicating that the sensed data and the data set up on the typebars fail to conform, relay R4 is not energized. For this condition, magnet 89 is energized, upon closure of cam contacts CC6, to cause the arm 86 to be disposed in the path of the projection 80, and thereby prevent the tripping of the printing hammers. Thus, the data represented by the differentially positioned typebars are not recorded. Further automatic machine operations are prevented too, by virtue of the opened contacts R4a, which prevent the holding circuit for relay R1 to be completed, upon opening of cam contacts CC1.

Further detailed description of the checking circuits is not believed necessary, in view of the detailed explanation in conjunction with a specific example. The checking circuits are completed, similarly to effect energization of all the relays R3, whenever the sensed data correspond to the data set up in the differentially positioned typebars.

It should be mentioned, that during each cycle, upon closure of cam contacts CC5 the reset magnet 125 is energized to effect the described resetting operations, so that the brushes 113 are reset or returned to the home position indicated in Figs. 4 and 7.

In this manner, the interpreting operations can be checked to determine whether or not the data stored in the printing unit and the sensed data correspond. The data stored in the printing unit is read out at differential times in the cycle to complete the checking circuits at the same times that the brushes 113, which are under the control of the sensing brushes, complete other parts of the said checking circuits to effect energization of the checking control relays R3. Then, at a later time in the cycle, the control magnet 89 for the printing hammers prevents or permits the printing of the stored data, depending upon whether or not the stored data is in agreement with the sensed data.

While there has been shown and described and pointed out the fundamental novel features of the invention as applied to a single modification it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An interpreting machine controlled by records bearing data designations having means for recording the interpreting data on the related records, means for sensing the data designations on the records, means for feeding the records, one at a time, and transporting them first to the sensing means and then to the recording means, said recording means including settable elements and means controlled by the sensing means for differentially positioning the said elements in accordance with the sensed designations, settable circuit closing means positioned by the differentially positioned elements, additional settable circuit closing means having means controlled by the sensing means for controlling the positioning of the latter in accordance with the sensed designations, a control circuit including both the said circuit closing means and a control device, means operated in timed relationship with the feeding means for effecting energization of the said control circuit whenever both of the said positioned circuit closing means represent the same data, and error manifesting means controlled by said control device.

2. A cyclically operable recording machine controlled by records bearing data designations, comprising means for sensing the designations on individual records during each cycle of operation of the machine, recording means including settable elements and means controlled by the sensing means at differential times in the cycle for differentially positioning the said elements in accordance with the sensed designations, additional means controlled by the sensing means at differential times in the cycle for representing the sensed designations, checking means jointly controlled by the differentially positioned elements and said representing means, said checking means including means for rendering the latter effective, in said cycle after the said designations are sensed at the differential times in the cycle, for determining the conformity of the data represented by the said positioned elements and representing means, and error manifesting means controlled by said checking means and rendered effective during the said cycle for manifesting an error when the data represented by the positioned elements and the representing means fail to conform.

3. A recording machine controlled by records bearing columns of data designations, comprising means for sensing the said columns of data designations, recording means including settable elements, one for each column of data to be recorded, and means under control of the sensing means for differentially positioning the elements in accordance with the sensed designations, additional means under control of the sensing means for representing the columns of sensed data designations, a plurality of control circuits, each including a control device, one for each column of data to be recorded, means jointly controlled by the said differentially positioned elements and said additional data representing means for controlling the completion of said control circuits, and error manifesting means controlled by said control device.

4. A cyclically operable recording machine controlled by records bearing data designations comprising means for sensing the designations on individual records during each machine cycle, recording means including settable elements and means controlled by the sensing means at differential times in each cycle for differentially positioning the said elements in accordance with the sensed designations, contact means controlled by the differentially positioned elements, additional contact means having movable means controlled by the sensing means at the differential times the designations are sensed each cycle for representing the sensed designations, circuit means, including a control device means including both the said contact means for controlling the energization of the said circuit means, at differential times in each cycle, immediately after the data designations are sensed, and error manifesting means controlled by said control device.

5. A recording machine controlled by records bearing data designations comprising means for sensing the data designations on the records, recording means including means under control of the sensing means for setting up the data to be recorded, additional means under control of the sensing means for representing the sensed data designations, means jointly controlled by the said setting up means and said additional means for determining the conformity of the data set up in the recording means and the representing means, and error manifesting means controlled by said determining means.

6. A recording machine controlled by records bearing data designations comprising means for sensing the data designations on the records, recording means including means under control of the sensing means for storing the data to be recorded, a plurality of circuit closing units, one of said units having means controlled by the sensing means in accordance with the sensed designations for representing the latter, and the other of said units having means controlled by the data storing means in accordance with the stored data, circuit means jointly controlled by both the said units for determining the correspondence of the data represented by both the said units and including control means energized in dependence upon said correspondence, and error manifesting means controlled by said control means.

JAMES W. BRYCE.

CERTIFICATE OF CORRECTION.

Patent No. 2,343,398. March 7, 1944.

JAMES W. BRYCE.

It is hereby certified that error appears in the printed specification of the above numbered patent requiring correction as follows: Page 6, first column, line 6, claim 3, for "device" read --devices jointly--; and that the said Letters Patent should be read with this correction therein that the same may conform to the record of the case in the Patent Office.

Signed and sealed this 30th day of May, A. D. 1944.

Leslie Frazer (Seal) Acting Commissioner of Patents.